United States Patent [19]

Khader, Mahmoud M. et al.

[11] Patent Number: 4,703,030

[45] Date of Patent: Oct. 27, 1987

[54] PARTIALLY REDUCED FERRIC OXIDE CATALYST FOR THE MAKING OF AMMONIA VIA THE PHOTOASSISTED REDUCTION OF MOLECULAR NITROGEN AND METHOD FOR THE PREPARATION OF THE CATALYST

[75] Inventors: Khader, Mahmoud M., Albany, Calif.; Norman N. Lichtin, Newton, Mass.

[73] Assignee: Trustees of Boston University, Boston, Mass.

[21] Appl. No.: 891,038

[22] Filed: Jul. 31, 1986

[51] Int. Cl.$^4$ ............................................. B01J 23/74
[52] U.S. Cl. ..................................... 502/338; 423/362
[58] Field of Search ................. 502/338; 423/362, 633

[56] References Cited

U.S. PATENT DOCUMENTS 3,787,335  1/1974  Yarrington .......................... 502/338
4,587,228  5/1986  Frank et al. .................... 502/338 X Primary Examiner—W. J. Shine
Attorney, Agent, or Firm—David Prashker

[57] ABSTRACT

A novel, activated catalyst is provided for the synthesis of ammonia via the photoassisted reduction of molecular nitrogen by water. The novel catalyst is an incompletely reoxidized hydrogen reduced ferric oxide which is prepared by the reduction of an iron oxide such as $\alpha$-Fe$_2$O$_3$ in an atmosphere of water vapor and hydrogen followed by oxidation oxygen or in air. The use of the activated catalyst in photoassisted methods for synthesis of ammonia produces yields of ammonia which are many times the stoichiometric equivalent of the Fe(II) in the catalyst employed.

16 Claims, No Drawings ved to provide preparation of the catalyst

PARTIALLY REDUCED FERRIC OXIDE CATALYST FOR THE MAKING OF AMMONIA VIA THE PHOTOASSISTED REDUCTION OF MOLECULAR NITROGEN AND METHOD FOR THE PREPARATION OF THE CATALYST

FIELD OF THE INVENTION

Present invention is concerned with activated catalysts useful for the photoassisted reduction of molecular nitrogen by water for the synthesis of ammonia, and is particularly directed to novel, partially reduced ferric oxide catalysts which maintain catalytic activity for extended periods of time which are at least one hundred hours in duration.

BACKGROUND OF THE INVENTION

The world's principal industrial process for synthesizing ammonia are the Haber-Bosch process and similar methodologies which combine molecular nitrogen with molecular hydrogen over solid catalysts at high temperatures and elevated pressures. These processes require relatively large amounts of energy, are technically very sophisticated, and are based primarily on the use of fossil fuels as the source of hydrogen. Because of their inherent nature and demanding technical requirements, such methodologies are appropriate only for large scale industrial producers which are able to provide the requisite ingredients in the necessary volumes, offer centralized production facilities, and maintain requisite distribution systems for effective use of the process.

Alternatives to large scale industrial methods for the production of ammonia have therefore been sought with the result that considerable research has been performed to find small scale, economically viable, and less energy demanding methods. One development has been the use of metal oxide catalysts and the use of gaseous nitrogen in the air. Exemplifying this development is U.S. Pat. No. 2,500,008 which describes the synthesis of ammonia from hydrogen and nitrogen which are combined with a finely divided iron oxide catalyst and subjected subsequently to ultrasonic vibrations. Another approach involves catalytic processes which synthesize ammonia from nitrogen and water without the use of elemental hydrogen, employing instead various wavelengths of photoenergy. Consistent with this approach is the use of solar energy in various forms as the single energy source and the use of water almost exclusively as the sole reducing agent. Exemplifying this latter approach are the following developments: "Photolysis of Water and Photoreduction of Nitrogen on Titanium Dioxide", *Journal Of The American Chemical Society* 99:7189-7193 (1977) which describes the photoreduction of nitrogen into ammonia using titanium dioxide alone or when doped with iron, cobalt, molybdenum or nickel, or using iron oxide alone; U.S. Pat. No. 4,113,590 which describes the synthesis of ammonia and hydrazine by reduction of gaseous nitrogen with water using metal oxide catalysts under the influence of ultraviolet light; U.S. Pat. No. 4,427,510 which describes the synthesis of nitrogen-containing compounds by combining metal oxide compounds with gaseous nitrogen, a reducing agent such as water, and sunlight or artificial light; wavelengths in the visible range; and U.S. patent application Ser. No. 634,322 filed July 25, 1984 and allowed Feb. 28, 1986 which describes a method of producing ammonia with or without the use of photoenergy using a solid metal oxide catalyst and an organic compound in aqueous medium.

Essential in each of these photoassisted processes and techniques is the presence of an active catalyst without which the synthesis of ammonia would not occur. A number of useful catalysts are known and conventionally employed in this art. They include $CoO$, $Co_3O_4$, $Cr_2O_3$, $\alpha$-$Fe_2O_3$, $MoO_3$, $Nd_2O_3$, $PbO$, $Pr_6O_{11}$, $TeO_2$, $WO_3$, La-Fe-oxide, La-Ti-oxide, Sr-Ti-oxide, Co-Mo-Ti-oxide, Pt-La-Ni-oxide, Pt-Sr-Ti-oxide, Zn-Fe-oxide, and $TiO_2$. These conventionally known metal oxides are useful individually or in combination; and may be used without any preconditioning or, optimally, may be pretreated to increase their catalytic activity. Examples of techniques for preconditioning of catalysts are described within U.S. Pat. Nos. 4,427,510 and 4,113,590.

Of the conventionally known catalysts iron oxide, typically in the form of alpha ferric oxide [$\alpha$-$Fe_2O_3$] is one of the most widely known and used. $\alpha$-$Fe_2O_3$ occurs in nature as the mineral hematite. It has the corundum structure where the oxide ions form a hexagonally close-packed array with Fe(III) ions occupying octahedral interstices. $\alpha$-$Fe_2O_3$ is an n-type semiconductor; has a band gap of about $2eV^1$; and can absorb at least 40% of the solar flux at ground level. It has, accordingly, been investigated as a light-absorbing electrode for photoassisted electrolysis of water [Wilhelm et al., *J. Electrochem. Soc.* 126:419 (1979); Giordano et al., *Int. J. Hydrogen Energy* 8:763 (1983)]; as an electrode for unbiased photoelectrochemical dissociation of water [Leygraf et al., *J. Phys. Chem.* 86:4484 (1982); Turner et al., *Chem. Phys. Lett.* 105:581 (1984)]; and as a catalyst in the photoassisted reduction of nitrogen to ammonia by water or by aqueous organic fluids [Schrauzer et al., *J. Am. Chem. Soc.* 99:7189 (1977); Lichtin and Vijayakumar, Abstracts of the 163rd Meeting of the Electrochemical Society, May 8-13, 1983, p. 782; Lichtin et al., Proceedings of the June 1985 meeting of the International Solar Energy Society, Montreal, Canada; and U.S. Pat. No. 4,427,510].

Nevertheless, despite all these investigations and applications of $\alpha$-$Fe_2O_3$, a number of deficiencies and shortcomings remain. These include: a recognized and recurring need for an effective and efficient catalyst which will promote the reaction of pure gaseous nitrogen or air with liquid water or water vapor in combination with photoenergy to yield ammonia; a long standing desire for a catalyst which maintains activity over an extended time such as a period of at least 100 hours in duration; and a widely acknowledged need for a catalyst which is more active in promoting the photoassisted reduction of dinitrogen by water than $\alpha$-$Fe_2O_3$ is and maintains this level of activity longer than $\alpha$-$Fe_2O_3$ does. Insofar as is presently known, there is no iron oxide catalyst of any formulation which is capable of providing these distinct advantageous.

SUMMARY OF THE INVENTION

The present invention comprises three major parts: a novel catalyst; a method for preparing the novel catalyst; and a method for making ammonia via the reduction of molecular nitrogen by water using the novel catalyst. Accordingly, a catalyst is provided which is active over an extended time period for photoassisted catalytic reactions comprising an incompletely reoxidized, hydrogen reduced ferric oxide containing not more than 5 atom percent of Fe(II).

A method for preparing a partially reduced ferric oxide is provided which is useful in photoassisted catalytic reactions comprising the steps of: exposing a free-flowing powder of iron oxide particles to a flowing mixture of molecular hydrogen and water vapor at a temperature preferably from about 400°–500° C. to yield a hydrogen reduced composition; and heating said hydrogen reduced composition in an oxygen containing environment at a temperature preferably from about 400°–500° C. whereby a partially reduced catalyst containing not more than about 5 atom percent Fe(II) is obtained.

In addition, a method for making ammonia via the reduction of molecular nitrogen is provided comprising the steps of: combining molecular nitrogen and water with an incompletely reoxidized, hydrogen reduced ferric oxide catalyst as a reaction mixture, the incompletely reoxidized, hydrogen reduced catalyst containing not more than about 5 atom percent of Fe(II); and adding photoenergy at a wavelength absorbable by the catalyst to the reaction mixture. The partially reduced ferric oxide catalyst is unusually effective and unexpectedly efficient in promoting the photoassisted reduction of molecular $N_2$ to $NH_3$ with water serving as the sole source of reducing equivalents. The activated ferric oxide catalyst remains active over extended time periods and provides yields of ammonia after 580 hours duration equivalent to 22 times the stoichiometric reducing capacity of the Fe(II) in the catalyst.

DETAILED DESCRIPTION OF THE PREFERRED EMBODIMENTS

The present invention is, in major part, a novel highly efficient ferric oxide catalyst which promotes the photoassisted reduction of molecular nitrogen by water for the synthesis of ammonia at greater rates and with higher yields of ammonia than have been possible previously. The methods for preparing this active catalyst and the method of its use for the synthesis of ammonia comprise the remainder of the present invention as a whole. To more easily understand and completely comprehend each aspect of the invention, the detailed description which follows herein will be divided into individual sections directed to a single aspect of the invention.

Preparation Of A Partially Reduced Iron Oxide Catalyst

The preparation of the activated catalyst begins by obtaining an iron oxide catalyst, preferably $\alpha$-$Fe_2O_3$, from commerical suppliers or as a naturally occurring mineral and pulverizing it into particles using conventional means. If the conventionally obtained $\alpha$-$Fe_2O_3$ is to be utilized in free-flowing powder form, the pulverized particles are exposed to a flowing mixture of molecular hydrogen and water vapor in ratios ranging from about 1:2–3:1 by volume to yield a hydrogen reduced composition. The particles of $\alpha$-$Fe_2O_3$ are exposed to the flowing mixture of dihydrogen and water vapor at an elevated temperature ranging from about 350°–600° C., and preferably about 400°–500° C., for a time period varying from about 6–10 hours, and preferably about 8 hours in duration. Subsequently, the resulting hydrogen reduced composition is heated in an oxygen containing environment such as pure $O_2$ or air at an elevated temperature of about 350°–600° C., and preferably at about 400°–500° C. for a time period ranging from about 10–60 minutes in duration.

Alternatively, if the novel catalyst is to be employed in pellet or disk-shaped configurations, a preliminary step is required. The pulverized, free-flowing powder is initially placed in a die under high pressure using conventional means known in this art to yield either pellet-shaped or disc-shaped compressed articles. Once configured into any desired shape, the compressed $\alpha$-$Fe_2O_3$ containing article undergoes sintering in air at an elevated temperature of at least 1100° C.—preferably in the range from 1100°–1400° C. and most preferably at about 1100°–1200° C.—for a time period ranging from about 8–36 hours, and preferably about 12–24 hours in duration. Subsequently, the configured articles of sintered $\alpha$-$Fe_2O_3$ are exposed to a flowing mixture of molecular hydrogen and water vapor, preferably comprising 70% $H_2$ and 30% $H_2O$ vapor at an elevated temperature ranging from about 350°–600° C., and preferably about 400°–500° C. for between about 5–20 minutes, and preferably 10 minutes in duration. The hydrogen reduced article is then heated in an oxygen containing environment such as $O_2$ or air for approximately 10–60 minutes at a temperature ranging from 350°–600° C., and preferably about 400°–500° C. The resulting article is a activated, partially reduced, ferric oxide catalyst containing not more than about 5 atom percent Fe(II).

The Partially Reduced Ferric Oxide Catalyst

It will be recognized and appreciated from the foregoing description that the novel catalyst of the present invention is the product of a reduction of ferric oxide in an atmosphere of water vapor and dihydrogen followed by oxidation by $O_2$ or air. This novel catalyst was analyzed using a variety of physical and chemical methods which provided the following data: the composition of the catalyst was estimated from its X-ray powder diffraction pattern by comparing the ratio of integrated step-counted intensities of the (220) spinel and the (012) corundum reflections with known standard of (Baker AR) spinel and Baker AR 99.9% pure $\alpha$-$Fe_2O_3$ [Cotton, F. A. and G. Wilkinson, *Advanced Inorganic Chemistry*, John Wiley & Sons, 1980, pp. 16–17 and 752–753]. These analyses indicated the presence of more than 90% $Fe_2O_3$ and less than 10% $Fe_3O_4$. Mossbauer spectroscopy of the catalyst [Hobson, M. C., "Mossbauer Spectroscopy", in *Experimental Methods In Catalytic Research*, Academic Press, vol. II, 1976, pp. 187–222; Shenoy, G. K. and F. E. Wagner, *Mossbauer Isomer Shifts*, North Holland Publishing Co., Amsterdam, 1978.] provided a spectrum which indicated that the major component in the partially reduced catalyst is $\alpha$-$Fe_2O_3$; specifically the data is H=515 kOe, E=0.12 mm/s, IS=0.60 mm/s with respect to sodium nitroprusside. In addition, the analysis demonstrated that $Fe_3O_4$ was detectable but constituted less than 10 mole percent of the total catalyst. Oxidimetric analysis [Hall, W. T., *Analytical Chemistry*, vol. 2, John Wiley & Sons, 1955, p. 543] of the catalyst in 5M aqueous HCl with $KMnO_4$ indicated that only from 3–5 atom percent of the iron in the partially reduced catalyst is Fe(II) while from 95–97 atom percent of the iron in the catalyst is Fe(III). For illustrative purposes only, a comparison of the data obtained by the physical/chemical analyses of the partially reduced catalyst is made with data commonly available in the literature regarding conventionally obtained $\alpha$-$Fe_2O_3$. The comparative data is provided by Table 1 below.

TABLE 1

| physical/chemical analysis | hydrogen reduced catalyst | conventionally obtained $\alpha$-Fe$_2$O$_3$ |
|---|---|---|
| atom % Fe (II) | 3-5 | <0.1 |
| Atom % Fe (III) | 95-97 | >99.9 |
| % Fe$_2$O$_3$ | >90 | >99.9 |
| 5 Fe$_3$O$_4$ | <10 | <0.1 |
| wavelengths of light energy absorbed | <620 nm (approximately) | <620 nm (approximately) |
| color of composition | purple | reddish-brown |
| magnetic | Yes | No |

Catalytic Method for Synthesizing Ammonia

The present invention utilizes the activated, partially reduced ferric oxide catalyst for the photoassisted reduction of molecular nitrogen by water to synthesize ammonia. The methodology combines pulverized free-flowing particles or sintered articles of incompletely reoxidized, hydrogen reduced $\alpha$-Fe$_2$O$_3$ prepared as described herein with molecular nitrogen (in pure gaseous form or as air) and water vapor in the presence of photoenergy. As used herein, photoenergy is defined as electromagnetic radiation including those wavelengths absorbable by the catalyst. Convenient forms of photoenergy include sunlight and light from various lamps or lasers. It will be appreciated and recognized that the novelty and uniqueness of the methodology described herein rely upon the use of the partially reduced catalyst alone and are otherwise conventionally known in the literature. For this reason, it will be expressly understood that other compositions, components and the like may be additionally employed in the methodology with the novel catalyst in the manner conventionally known in this art. Accordingly, the water may be supplied in the form of aqueous solutions, colloids, suspensions, or slurries containing a variety of different materials such as organic compounds of varying composition and formulation. Furthermore, while the methodology described herein is intended to be used at ambient temperatures and pressures and is thus preferably performed at one atmosphere of pressure and at temperatures ranging from about 10°-60° C. If desired, however, the temperature and pressure ranges can be altered to meet individual requirements or circumstances in order to produce optimum yields of ammonia.

In the description of the method for synthesizing ammonia which follows, the process was carried out in a thermostatically controlled pyrex glass cell containing the partially reduced ferric oxide catalyst in an aqueous suspension which was illuminated with a 500 watt quartz-halogen lamp or a 150 W xenon lamp with or without a 420 nanometer (hereinafter "nm") cutoff filter which removed all shorter wavelengths of light. The incident light flux (intensity) was preferably 15-20 mW/cm$^2$ and the surface area illuminated was about 15-25 cm$^2$.

In those experiments evaluating the properties of the novel, partially reduced catalyst, pure gaseous nitrogen was passed through the pyrex reaction cell at a rate of 0-300 milliliters per minute (hereinafter "ml/min") with a rate of 20-40 ml/min being preferred. The ammonia synthesized as the catalytic reaction product remained in part within the reaction cell and in part was trapped from the effluent gas in mildly acidified (0.01M acid) ice-cold water. The empirically obtained yields of ammonia were measured using Nesslers and/or the trichloramine method of analyses [Hall, W. T., *Analytical Chemistry*, vol. 1, John Wiley & Sons, 1932, p. 94; Tomer and Lambert, *Anal. Chem.* 34:1738 (1962)].

The unexpected and advantageous properties of the novel catalyst comprising part of the present invention are demonstrated by a series of experiments utilizing 60 milligrams of partially reduced catalyst in free-flowing powder form which had been suspended in 60 ml of unbuffered distilled water as a 0.1 w/v % suspension in the presence of excess, flowing pure gaseous nitrogen. This reaction mixture was exposed to unfiltered light energy at all wavelengths transmitted by pyrex glass and water from a 150 W xenon lamp at 25° C. which provided an incident light intensity of 15 mW/cm$^2$ over approximately 15 cm$^2$ of area, a total illumination of 225 mW of unfiltered light. The catalytic reaction was allowed to proceed for 580 hours at which time the experiment was intentionally terminated. The empirically obtained results are usefully compared with data for the synthesis of ammonia utilizing conventionally obtained $\alpha$-Fe$_2$O$_3$ evaluated under similar test circumstances as follows: 0.1 w/v % suspension of untreated, $\alpha$-Fe$_2$O$_3$ powder was made using a 30 ml volume of water. This suspension was illuminated with unfiltered light from a 150 W xenon lamp at 28° C. which provided an incident light intensity of 47 mW/cm$^2$ and a total illumination of 530 mW to the suspension. The catalytic reaction was allowed to proceed until no further net production of ammonia was observed. The comparative data is presented by Table 2 below.

TABLE 2

| | 0.1 w/V % suspension of incompletely reoxidized, hydrogen reduced ferric oxide catalyst: Illuminated with 225 mW of unfiltered light | | 0.1 w/V % suspension of conventional $\alpha$-Fe$_2$O$_3$: Illuminated with 530 mW of unfiltered light | |
|---|---|---|---|---|
| Total reaction Time (hours) | Total Yield ($\mu$moles) | Incremental Rate during period ending at indicated Reaction Time ($\mu$mole/hour) | Total Yield ($\mu$moles) | Incremental Rate during period ending at indicated Reaction Time ($\mu$moles/hour) |
| 1 | 0.8 | 0.8 | 0.15 | 0.15 |
| 2 | 1.6 | 0.8 | 0.28 | 0.13 |
| 4 | 3.2 | 0.8 | 0.40 | 0.06 |
| 12 | 9.6 | 0.8 | 0.50 | 0.013 |
| 20 | 16.6 | 0.83 | 0.58 | 0.010 |
| 50 | 39.6 | 0.77 | **** | **** |
| 72 | 52.0 | 0.56 | **** | **** |
| 144 | 83.0 | 0.43 | **** | **** |
| 192 | 94.0 | 0.23 | **** | **** |
| 232 | 100.0 | 0.15 | **** | **** |
| 328 | 113.0 | 0.14 | **** | **** |
| 434 | 132.0 | 0.18 | **** | **** |

TABLE 2-continued

| | 0.1 w/V % suspension of incompletely reoxidized, hydrogen reduced ferric oxide catalyst: Illuminated with 225 mW of unfiltered light | | 0.1 w/V % suspension of conventional α-Fe$_2$O$_3$: Illuminated with 530 mW of unfiltered light | |
|---|---|---|---|---|
| Total reaction Time (hours) | Total Yield (μmoles) | Incremental Rate during period ending at indicated Reaction Time (μmole/hour) | Total Yield (μmoles) | Incremental Rate during period ending at indicated Reaction Time (μmoles/hour) |
| 506 | 137.0 | 0.07 | **** | **** |
| 578 | 141.0 | 0.06 | **** | **** |

*No further net production of ammonia after 20 hours

It will be recognized and appreciated from the data of Table 2 that the 0.1 w/v % suspension of incompletely reoxidized, hydrogen reduced ferric oxide provided with 225 m/W of unfiltered light from a 150 W xenon lamp demonstrated an incremental rate of reaction for ammonia production which was substantially constant for the first 50 hours at about 0.8 μmoles per hour; this incremental rate of production then decline slowly after the 50th hour such that the average incremental rate between the 434th and 506th hour was about 0.07 μmoles per hour. Synthesis of ammonia continued in the reaction mixture until the 580th hour by which time the total yield of ammonia was 141 μmoles. Production of ammonia was seen to continue after this extended duration of reaction but the experiment was intentionally terminated at this point.

In comparison, the conventional α-Fe$_2$O$_3$ illuminated with 530 mW of unfiltered light from a 150 W xenon lamp demonstrated an incremental rate of reaction for ammonia production which was only 0.15 μmoles per hour initially and which decreased rapidly to 0.010 μmoles per hour at the 20th hour of reaction. No further net production of ammonia was observed after 20 hours of reaction time. The performance differences between conventional αFe$_2$O$_3$ and the novel ferric oxide catalyst may thus be summarized by the data of Table 3.

TABLE 3

| Criterion | Incompletely reoxidized, hydrogen reduced ferric oxide catalyst | Conventional α-Fe$_2$O$_3$ |
|---|---|---|
| Performance over first 4 hours | 3.2 μmoles NH$_3$ produced | 0.40 μmoles NH$_3$ produced |
| Performance over first 12 hours | 9.6 μmoles NH$_3$ produced | 0.50 μmoles NH$_3$ produced |
| Longevity | Activity after 100 hours is more than 50% of initial activity | Activity absent after 20 hours |

It is therefore apparent from the data of Tables 2 and 3 that both the incremental rate and the total ammonia production in micromoles for the novel catalyst is far greater than the rate and yield of ammonia obtainable using the conventionally known α-Fe$_2$O$_3$ catalyst under similar illumination conditions regardless of the time of evaluation. The data unequivocally demonstrate that the novel, partially reduced catalyst remains active for production of ammonia after hundreds of hours of illumination and provides a total yield of ammonia in the 580th hour of reaction equivalent at least to 22 times the stoichiometric capacity of the 60 mg of catalyst [containing at most 6.3 μmoles of Fe(II)] for reduction of dinitrogen to ammonia.

Other experiments were conducted which demonstrate that the rate per hour yield of ammonia synthesis and the total yields of ammonia obtained depend: upon whether the partially reduced catalyst is in the form of a free-flowing, pulverized powder or is in the form of a sintered article configuration; on the volume of water; on the weight of catalyst employed; on the intensity of light energy employed; on the temperature at which the reaction occurs; and upon the pH of the reaction mixture. Some preferred ranges of use for optimal production of ammonia using the novel catalyst in the described method are provided by Table 4.

TABLE 4

| Factor* | Range of Use | Range which Gives Highest Yield | Range(s) Which Give Lowest Yield(s) |
|---|---|---|---|
| Wavelength of Light, nm | 320–680 | <500 | >620 |
| Intensity of Light at >420 nm, mW/cm$^2$ | 5–35 | 15–25 | <5 and >35 |
| pH | 2.4–13 | 7–10 | <3 and >12.5 |
| Temp., °C. | 10–50 | 10–30 | >45 |

*Unless otherwise specified, 0.1 wt/vol % of free-flowing powdered catalyst at 25° C., unbuffered pH, 15 mW/cm$^2$ of light at wavelengths above 420 nm from a 150 W xenon lamp.

The present invention is not to be restricted in form nor limited in scope except by the claims appended hereto.

What we claim is:

1. A method for preparing a partially reduced ferric oxide catalyst useful in photo assisted catalytic reactions, comprising the steps of:
    exposing particles of iron oxide to a flowing mixture of molecular hydrogen and water vapor at a temperature ranging from about 350°–600° C. to yield a hydrogen reduced composition; and
    heating said hydrogen reduced composition in an oxygen containing environment at a temperature ranging from about 350°–600° C. whereby a partially reduced ferric oxide catalyst containing not more than about 5 atom percent Fe(II) is obtained.

2. A method for preparing a partially reduced ferric oxide catalyst useful in photoassisted catalytic reactions comprising the steps of:
    sintering a configured article comprising iron oxide particles in air at a temperature of at least 1100° C.;
    exposing said sintered article to a flowing mixture of molecular hydrogen and water vapor at a temperature ranging from about 350°–600° C. to yield a hydrogen reduced composition; and
    heating said hydrogen reduced composition in an oxygen containing environment at a temperature ranging from about 350°–600° C. whereby a partially reduced ferric oxide catalyst containing not more than about 5 atom percent Fe(II) is obtained.

3. The method as recited in claim 1 or 2 wherein said exposure to molecular hydrogen and water vapor is at a temperature ranging from 400°-500° C.

4. The method as recited in claim 1 or 2 wherein said heating of said hydrogen reduced composition is at a temperature ranging from 400°-500° C.

5. The method as recited in claim 2 wherein said sintering is at a temperature ranging from 1100°-1400° C.

6. The method as recited in claim 2 wherein said sintering is at a temperature ranging from 1100°-1200° C.

7. The method as recited in claim 1 or 2 wherein said hydrogen and water is present at a ratio ranging from 1:2-3:1 by volume.

8. The method as recited in claim 1 or 2 wherein said hydrogen and water is present as a mixture containing 70% hydrogen and 30% water.

9. The method as recited in claim 1 or 2 wherein said ferric oxide is $\alpha$-$Fe_2O_3$.

10. The method as recited in claim 1 wherein said exposure to molecular hydrogen and water vapor is for a time period ranging from about 6 hours to 10 hours.

11. The method as recited in claim 1 or 2 wherein said heating of said hydrogen reduced composition is for a time period ranging from about 10-60 minutes.

12. The method as recited in claim 2 wherein said sintering proceeds for a time period ranging from 8-36 hours.

13. The method as recited in claim 2 wherein said sintering proceeds for a time period ranging from 12-24 hours.

14. The method as recited in claim 2 wherein said exposure to molecular hydrogen and water vapor is for a time period ranging from about 5-20 minutes.

15. A catalyst active over an extended time period for photo-assisted catalytic reactions comprising iron oxide which has been exposed to a flowing mixture of molecular hydrogen and water vapor at a temperature ranging from about 350°-600° C. and which was then heated in an oxygen containing environment at a temperature ranging from about 350°-600° C. to yield a partially reduced ferric oxide catalyst containing not more than 5 atom percent of Fe(II).

16. A catalyst active over an extended time period for photo-assisted catalytic reactions comprising ferric oxide which has been exposed to a flowing mixture of molecular hydrogen and water vapor at a temperature ranging from about 350°-600° C. and which was then heated in an oxygen containing environment at a temperature ranging from about 350°-600° C. to yield a partially reduced ferric oxide catalyst containing not more than about 5 atom percent Fe(II).

* * * * *